United States Patent [19]
Schmitz

[11] Patent Number: 5,422,927
[45] Date of Patent: Jun. 6, 1995

[54] DENTAL X-RAY FILM HOLDER AND METHOD OF USE

[75] Inventor: William B. Schmitz, 43741 Citrus View Dr., Hemet, Calif. 92544

[73] Assignee: William B. Schmitz, Hemet, Calif.

[21] Appl. No.: 28,390

[22] Filed: Mar. 9, 1993

Related U.S. Application Data

[63] Continuation-in-part of Ser. No. 895,269, Jun. 8, 1992.

[51] Int. Cl.⁶ .............................................. G03B 42/02
[52] U.S. Cl. ...................................... 378/170; 378/168
[58] Field of Search ........................ 378/168, 169, 170

[56] References Cited

U.S. PATENT DOCUMENTS

| | | | |
|---|---|---|---|
| 2,286,748 | 6/1942 | Martin | 378/169 |
| 2,522,201 | 9/1950 | Stern | 378/170 |
| 2,736,814 | 2/1956 | Lederman et al. | 378/168 |
| 2,782,317 | 2/1957 | Vacanti et al. | 378/170 |
| 4,108,308 | 8/1978 | Franke et al. | 378/169 |
| 4,251,732 | 2/1981 | Fried | 378/170 |
| 4,815,117 | 3/1989 | Waldo | 378/170 |

*Primary Examiner*—Craig E. Church
*Attorney, Agent, or Firm*—Price, Gess & Ubell

[57] ABSTRACT

Disclosed is a dental X-ray film packet 12 holder having a substantially flat, substantially rigid body member 14. The body member 14 has an anterior end 18 including a first film packet-holding slot 16 extending into the body member 14, and a posterior end 22 including a second film packet-holding slot 20 extending into the body member 14. Between the anterior and posterior ends 18 and 22 is a lateral side edge 28 from which extends guideposts 24 and 26 used to correctly position the cone 62 of an X-ray camera with respect to the film packet 12.

23 Claims, 4 Drawing Sheets

FIG. 1
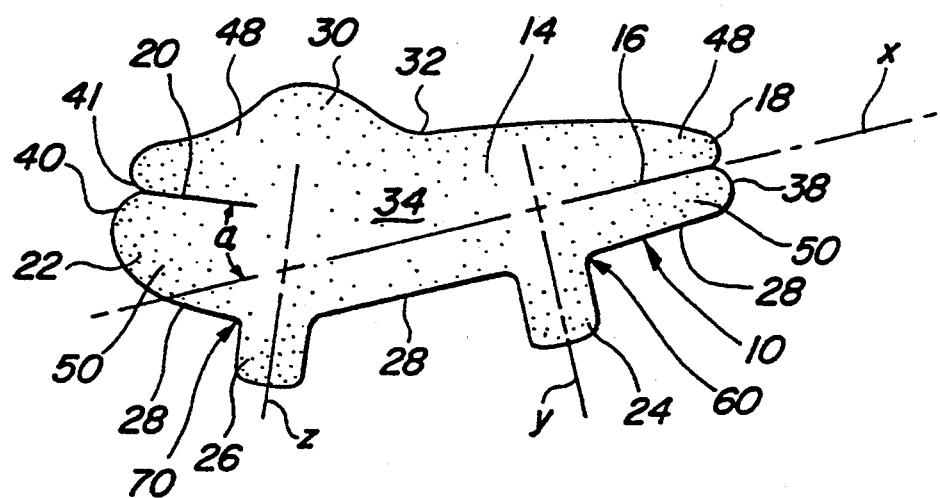
FIG. 2A
FIG. 2B
FIG. 3
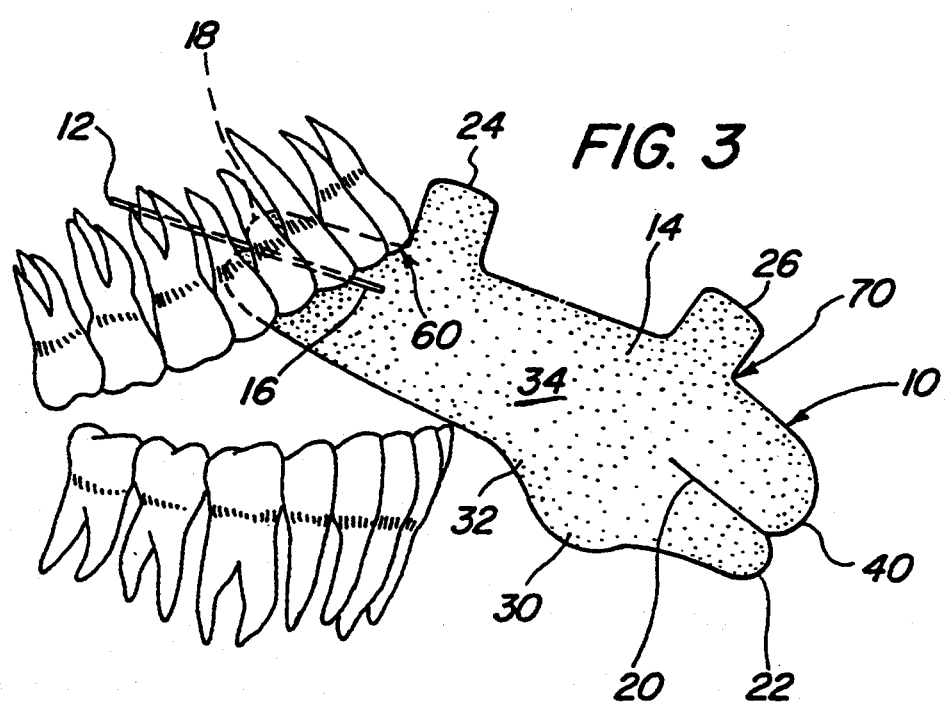

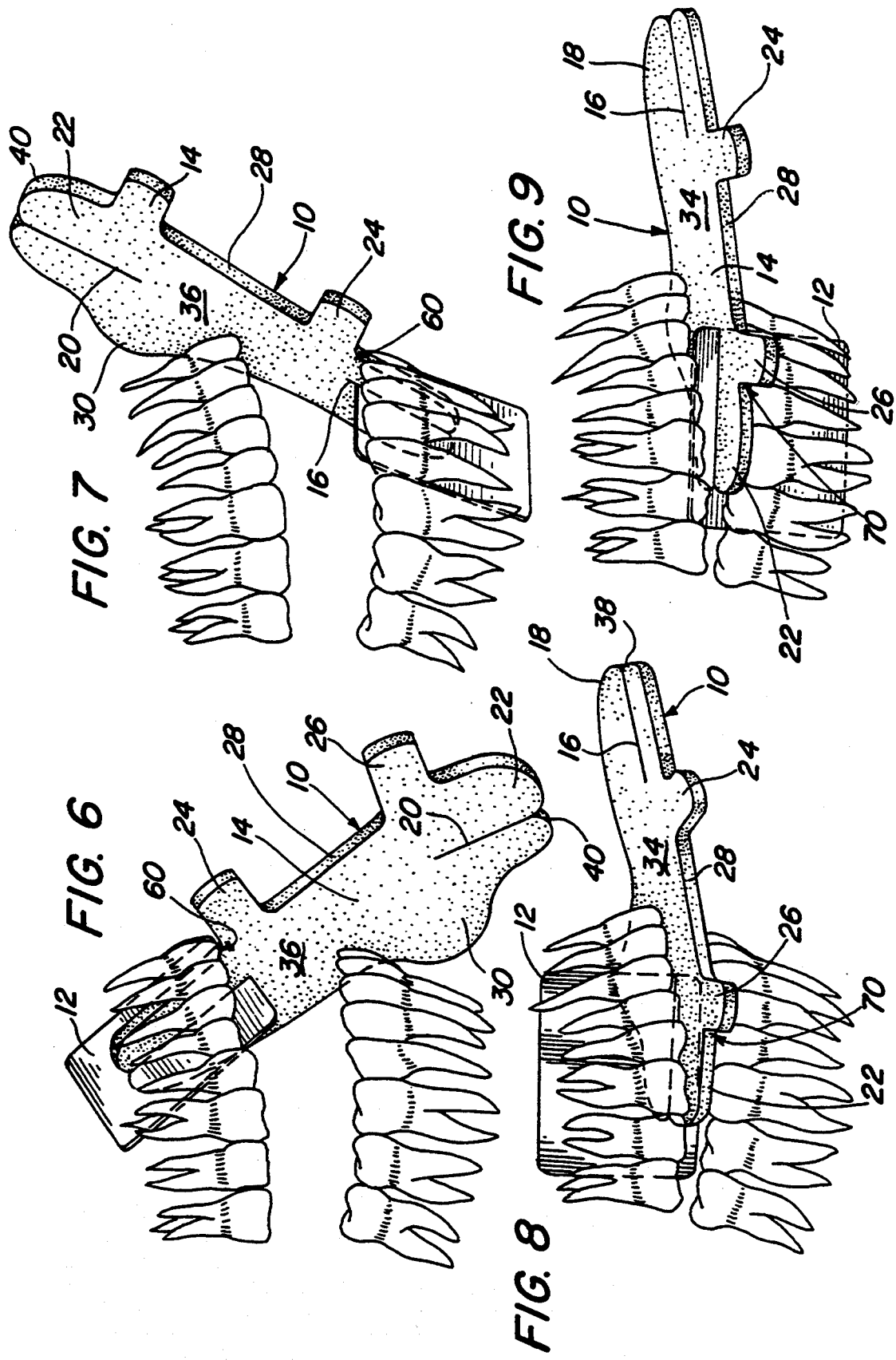

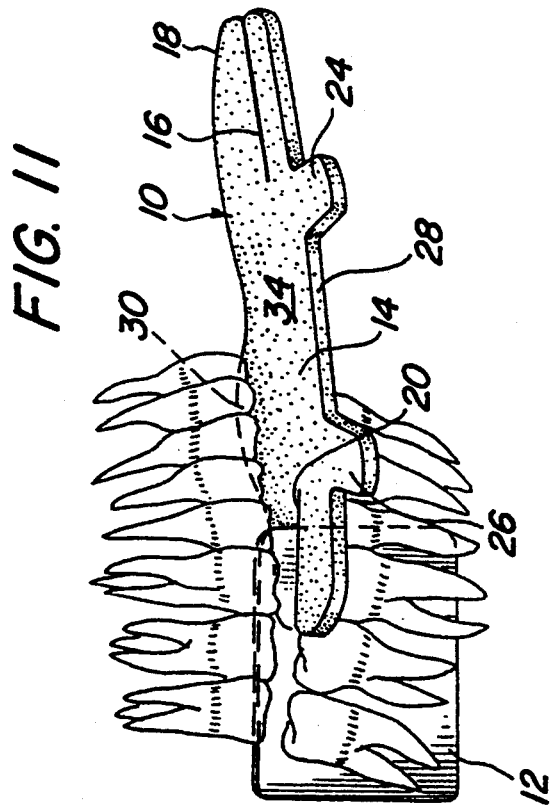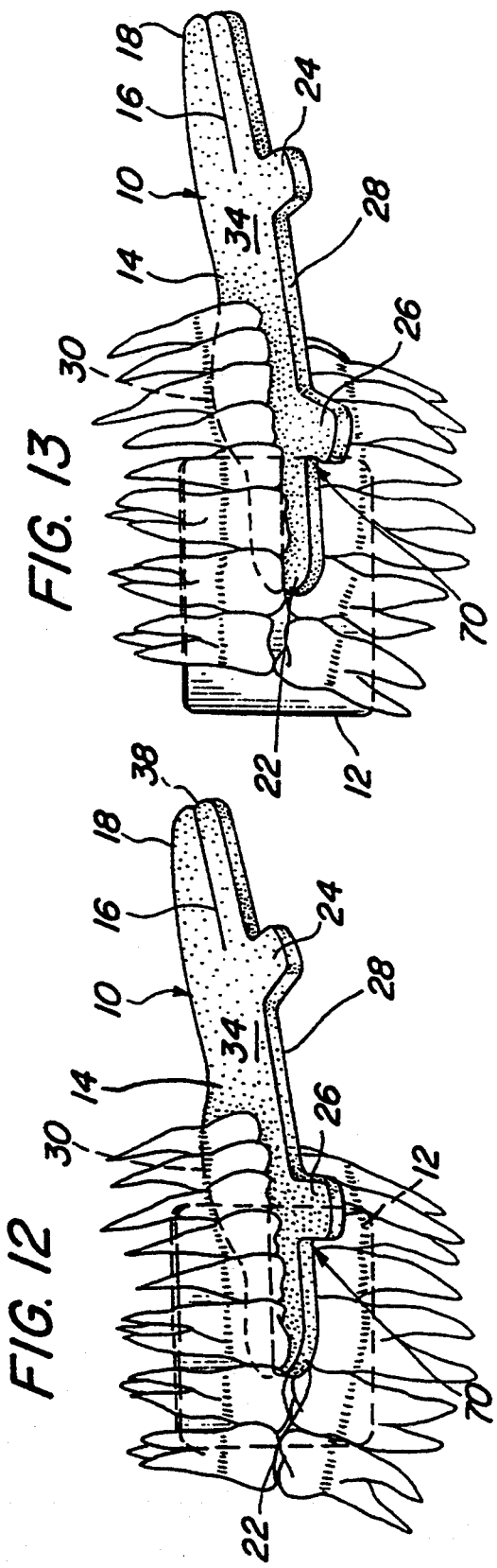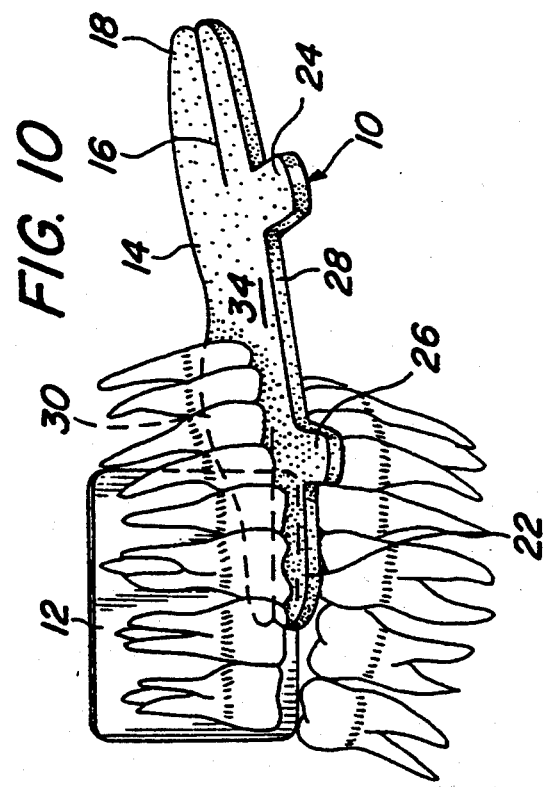

DENTAL X-RAY FILM HOLDER AND METHOD OF USE

This application is a continuation-in-part of application Ser. No. 895,269, filed Jun. 8, 1992, for DENTAL X-RAY FILM HOLDER AND METHOD OF USE, by William B. Schmitz.

BACKGROUND OF THE INVENTION

1. Field of the Invention

This invention relates to a disposable device for holding dental X-ray film in the mouth of a patient while taking an X-ray of the patient s teeth.

2. Description of Related Art

It is common practice to use a device to hold a dental X-ray film packet in the mouth of a patient. This packet is rectangular, having dimensions of about 1.75 inches in length, about 1.25 inches in width, and about 0.0625-inch thick. The packet includes film contained within a plastic envelope having a smooth, planar surface on one side and another planar surface with a tab on the opposite side.

When taking an X-ray of teeth, the packet is placed with the smooth side snug against the inside surface of the teeth. To avoid distortion, the camera is aligned so that the X-rays exit the camera from the tip of a cone as a beam which is at a right angle with respect to the center of the surface of the film packet when the cone and packet are correctly aligned. With the anterior teeth, it is sometimes difficult to place the film packet snug against the teeth. A procedure known as the bisecting angle technique is used when the film packet cannot be placed snug against the inside surface of the teeth. The angle formed between the plane of the film packet and the plane of the teeth is estimated, and a plane which bisects this angle is used as the reference plane for right angle alignment of the X-ray beam.

There are several different dental X-ray film holding devices commonly employed which usually must be sterilized after each use, are uncomfortable, or even painful, and are difficult to use. One feature of many of these devices is a guide member which assists in aligning the X-ray camera with the center of the front surface of the film and the reference plane when using the bisecting angle technique.

Without limiting the scope of this invention as expressed by the claims which follow, its more prominent features will now be discussed briefly. After considering this discussion, and particularly after reading the section entitled "DETAILED DESCRIPTION OF THE PREFERRED EMBODIMENTS," one will understand how the features of this invention provide its advantages, which include convenience and comfort, simplicity of use, and low manufacturing cost.

SUMMARY OF THE INVENTION

The device has a body member with substantially flat, parallel, spaced-apart face surfaces. This body member has anterior and posterior ends, and there is a slot extending into the body member from each end. Each slot is adapted to hold a single X-ray film packet manually inserted into the slot. The packet may be moved to different positions within a slot while maintaining a generally right angle orientation with respect to the face surfaces of the body member. The body member is rigid so that it does not easily bend about a longitudinal axis extending between the anterior and posterior ends. The anterior and posterior ends are spaced apart at a distance which enables either the anterior end or the posterior end to be inserted into the mouth of the patient with the opposed end and still have a portion of the body member extending beyond the mouth. Typically, the body member has a length between about 3.75 and about 4.50 inches, a width between about 1.75 and about 2.00 inches, and a thickness between about 0.125 and about 0.25-inch. The body member is preferably made of a polymeric foam material such as, for example, an expanded polystyrene extruded sheet having a density of from about 40 to about 55 pounds per cubic foot. The material surrounding the slots forms jaws on opposed sides of each slot. These jaws provide resilient clamping action upon inserting a film packet into a slot. Biting the body member by a patient causes its jaws to close tightly on the film packet. Each slot has a length between 0.50 and 1.75 inches, extends into the body member along a straight line, and is at a right angle with respect to the face surfaces of the body member. The slot in the anterior end has a length between 0.50 and 1.35 inches. The slot in the posterior end has a length between 0.50 and 1.25 inches and extends between a posterior side edge of the body member inward into the body member along a straight line. Each slot is defined by spaced-apart walls formed in the body member that are separated by a narrow gap. Each slot has an open end lying either along the anterior side edge or posterior side edge, as the case may be, and an internal end within the body member. The spaced-apart walls are serrated, creating a roughened gripping surface for holding the film packet that is inserted. Each gap has a substantially uniform width between about 0.004 and about 0.015-inch, 0.007 being preferred. Between the anterior and posterior ends is a first lateral side edge from which extends a positioning element. Preferably, the positioning element includes an anterior guide member and a posterior guide member. The anterior guide member extends outward from the first lateral side edge at substantially a right angle to the anterior slot, and the posterior guide member extends outward from the same lateral side edge at substantially a right angle to the posterior slot. The posterior guide member is displaced inward from the posterior side edge by a distance between about 0.75 and about 1.25 inches, and the anterior guide member is displaced inward from the anterior side edge by a distance between about 1.125 and about 1.50 inches. Each guide member has a length between about 0.50 and about 0.75-inch and a width between about 0.3125 and about 0.375-inch. An outwardly-projecting body section which provides reinforcement is located near an inward portion of the posterior slot. Thus, upon inserting the film packet into the posterior slot, the body member will not fracture. The body section extends outward from a second lateral side edge of the body member which is opposed to the first lateral side edge.

This invention also includes the method of taking an X-ray picture of a patient's teeth by placing a dental X-ray film packet in the holder of this invention, inserting the holder into the mouth of the patient, and aligning the cone of the X-ray camera using a guide member to position the cone correctly with respect to the film packet.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 1 is a plan view of the dental X-ray film holder of this invention;

FIG. 2A is a side elevational view of the holder depicted in FIG. 1, showing an edgewise view of the guide members;

FIG. 2B is a side elevational view of the holder depicted in FIG. 1, showing the lateral side edge opposite the guide members;

FIG. 3 is a schematic illustration using the holder of this invention to position a dental X-ray film packet adjacent the upper central incisors viewing the right-hand side of the mouth;

FIG. 6 is a schematic illustration using the holder of this invention to position a dental X-ray film packet adjacent the upper lateral cuspid, viewing the right-hand side of the mouth;

FIG. 7 is a schematic illustration using the holder of this invention to position a dental X-ray film packet adjacent the lower lateral cuspid, viewing the right-hand side of the mouth;

FIG. 8 is a schematic illustration using the holder of this invention to position a dental X-ray film packet adjacent the upper bicuspid, viewing the right-hand side of the mouth;

FIG. 9 is a schematic illustration using the holder of this invention to position a dental X-ray film packet adjacent the lower bicuspid, viewing the right-hand side of the mouth;

FIG. 10 is a schematic illustration using the holder of this invention to position a dental X-ray film packet adjacent the upper molar, viewing the right-hand side of the mouth;

FIG. 11 is a schematic illustration using the holder of this invention to position a dental X-ray film packet adjacent the lower molar, viewing the right-hand side of the mouth;

FIG. 12 is a schematic illustration using the holder of this invention to position a dental X-ray film packet for a forward bitewing picture of the bicuspids and molars, viewing the right-hand side of the mouth; and FIG. 13 is a schematic illustration using the holder of this invention to position a dental X-ray film packet for a rear bitewing picture of the molars, viewing the right-hand side of the mouth.

DESCRIPTION OF THE PREFERRED EMBODIMENTS

Figure 4:
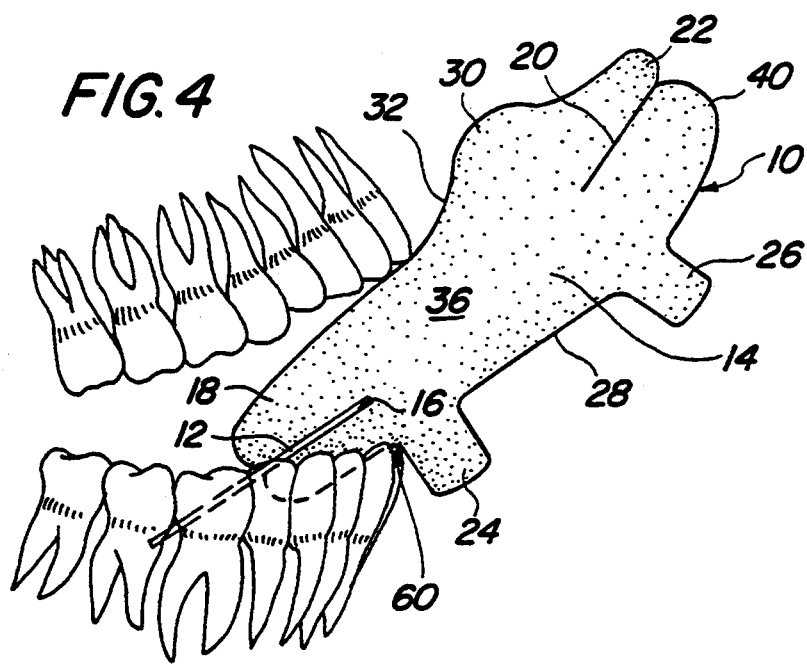
FIG. 4 is a schematic illustration using the holder of this invention to position a dental X-ray film packet adjacent the lower central incisors, viewing the right-hand side of the mouth.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide, as illustrated in FIGS. 1 and 2, a device 10 for holding a dental X-ray film packet 12 that includes a body member 14 having a unique, predetermined silhouette which enables the device 10 to be easily inserted into the mouth of a patient in the exact manner required to obtain a high-quality X-ray picture of the patient's teeth. FIGS. 3–7 illustrate how the device 10 is used to position the film packet 12 for the right-hand, upper, and lower incisor teeth (the anterior teeth). FIGS. 8–13 illustrate how the device 10 is positioned for the right-hand, upper, and lower rear teeth (the posterior teeth).

The body member 14 has a length of about 4.25 inches and a width taken across its widest breadth of about 1.65 inches. This body member 14 is formed by severing it from a sheet of extruded expanded polystyrene foam having a thickness of approximately 3/16-inch and a density of 48 pounds per cubic foot. A water jet is used to cut the body member 14 from the sheet material.

The key elements of device 10 include: a slot 16 in the anterior end 18; a slot 20 in the posterior end 22; a pair of guideposts 24 and 26 extending outwardly from a lateral side edge 28; and a lingual hump 30 extending outwardly from another lateral side edge 32. The posterior end 22 and lateral side edge 32 are shaped so that the patient's tongue lies adjacent the lateral side edge 32 and is partially depressed by the lingual hump 30 when the device 10 is positioned to take X-rays of the posterior teeth, as depicted in FIGS. 8–13. The lingual hump 30 also provides reinforcement for the body member 14 adjacent to the posterior slot 20, particularly at the inner rear portion of this slot. The body member 14 has opposed, smooth, flat faces 34 and 36, and has a unique silhouette outlined by anterior edge 38, posterior edge 40, and the lateral edges 28 and 32. Posterior edge 40 has a gap 41 cut into it at the point the posterior slot 20 meets the edge 40.

A longitudinal axis x extends lengthwise between the anterior and posterior ends 18 and 22, with the anterior slot 16 lying along a portion of this axis x. The anterior guidepost 24 is approximately 1.25-inch inward from the anterior end 18, and it has an axis y (FIG. 1) which is substantially at a right angle with respect to the anterior slot 16. The posterior slot 20 is at an acute angle a of approximately 16 degrees with respect to the axis x. The posterior guidepost 26 is displaced inward approximately one inch from the posterior end 22, and it has an axis z which is substantially at a right angle with respect to the posterior slot 20. Each guidepost 24 and 26 has a width of about 0.30-inch and a length of about 0.45-inch. As will be discussed in greater detail subsequently, the guideposts 24 and 26 serve to assist the X-ray technician in correctly aligning the X-ray camera with respect to a film packet 12 being held by the device 10 in the mouth of a patient.

Figure 5:
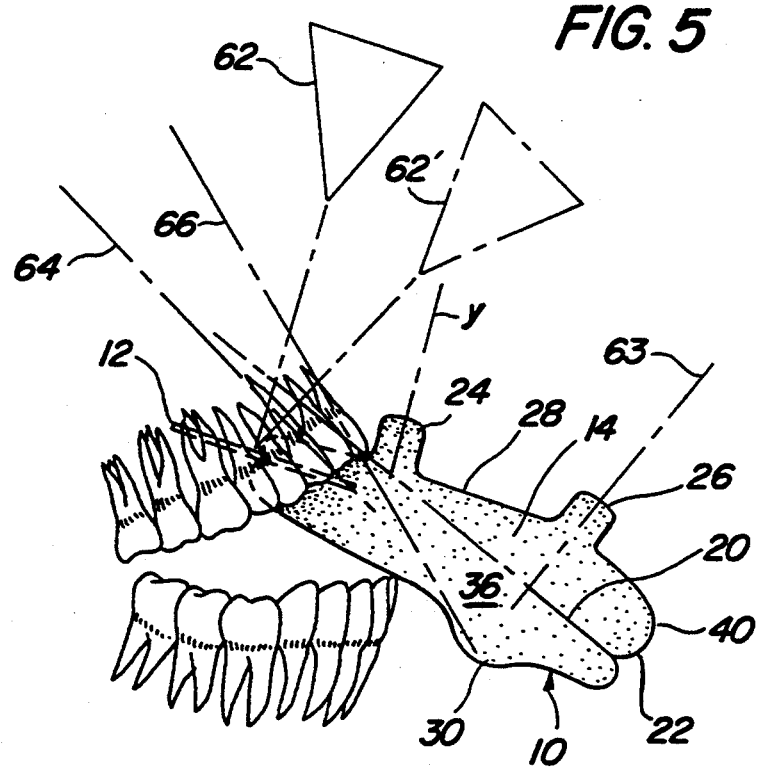
FIG. 5 is a schematic illustration similar to FIG. 3, illustrating positioning the cone of an X-ray camera with respect to the film packet.
Figure 5A:
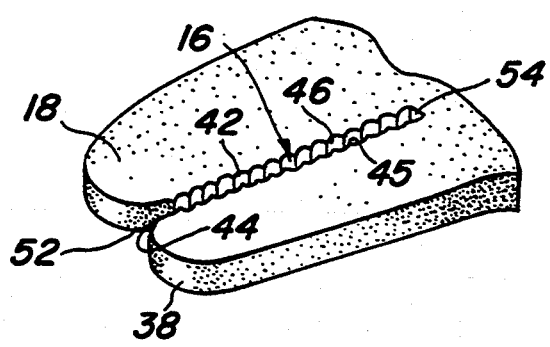
FIG. 5A is an enlarged, fragmentary perspective view of the anterior end of the holder of this invention.

It is important that the slots 16 and 20 have a relatively narrow gap between the walls created when a slot is formed, so that the packet 12 is gripped firmly, yet may still move within the slot upon application of pressure. FIG. 5A illustrates the anterior slot 16. This anterior slot 16 is about 1.0-inch in length and is at a right angle with respect to the faces 34 and 36. The slot 16 has a gap 42 created between spaced-apart, parallel walls 44 and 46 formed when this slot is cut into the body member 14 by a water jet cutter. Such a cutter leaves serrations 45 on both walls 44 and 46. The distance between the walls 44 and 46, the slot width, is preferably about 0.007-inch. The posterior slot 20 is similar to slot 16, except it has a length of about 0.75-inch.

The material surrounding the slots 16 and 20 creates jaws 48 and 50 (FIG. 1). These jaws 48 and 50 are biased in a normally closed position. The jaws 48 and 50 are opened upon inserting an edge of the X-ray film packet 12 into an open end of a slot. For example, as depicted in FIG. 5A, the film packet 12 is pushed into the open end 52 of the slot 16 until the film edge abuts an internal, terminal end 54 of the slot 16. This opens the jaws, which are resilient, slightly and tends to cause them to clamp onto the packet 12. Moreover, the serration 45 formed in the walls 44, 46 of the slot 42 tend to grasp the film packet 12. When the patient bites onto the device 10, this pushes the walls 44 and 46 closer together. Upon removing the packet 12, the jaws 48 and 50 close, because the material has sufficient resiliency to accomplish this even though tooth impressions remain. A packet 12 may be removed and reinserted several times without unduly diminishing the spring action of the jaws 48 and 50. Moreover, after insertion, the packet 12 may be moved up, down, or sideways in a slot to exactly position the packet as required for the particular teeth being X-rayed.

To use the device 10, a film packet 12 is inserted into a slot, and then the device 10, while holding the film packet, is inserted into the mouth of the patient. The film packet 12 is located adjacent the inside of the teeth between the teeth and tongue, with the smooth side of the packet facing the teeth. FIGS. 3 and 5 illustrate the way the device 10 would be inserted into a patient's mouth to take an X-ray picture of the upper, right central incisor. Here, the device 10 is inserted with the film packet 12 in the anterior slot 16, with the faces 34 and 36 of the body member 14 generally being parallel to the median sagittal plane bisecting the head of the patient, with the face of the film packet being generally at a right angle to the sagittal plane. The incisor teeth bite down on the junction 60 between the anterior guidepost 24 and the lateral edge 28. This junction 60 thus serves to both aid in positioning the device 10 correctly in the patient's mouth and assists the patient in firmly gripping the device with the teeth. The patient's jaws are closed to bite onto the lateral edges 28 and 32 and hold the device 10 firmly, allowing an X-ray to be taken.

FIG. 5 illustrates taking an X-ray in two ways: the normal technique depicted in solid lines, and the bisecting angle technique depicted in phantom lines.

Normal Technique

If the film packet 12 can be positioned closely next to the inside surface of the anterior teeth, the cone 62 of the X-ray camera is aligned in the normal manner, 1 as depicted in solid lines in FIG. 5. The X-ray camera is aligned so that the tip of the cone 62 overlies the center of the packet 12, with the axis of the cone generally parallel to the axis y of the anterior guidepost 24. Since the X-ray technician can observe the position of the anterior guidepost 24 which projects from the patient's mouth, the technician can then accurately position the cone 62 relative to this anterior guidepost to align the cone correctly with the film packet 12.

Bisecting Angle Technique

When employing the bisecting angle technique, the technician estimates the location of a reference plane 64 which would bisect the angle formed between the plane of the packet 12 and the longitudinal axis 66 of the front central incisor tooth by knowing that plane 64 is perpendicular to anterior guidepost 26. The cone 62 is positioned relative to the reference plane 64 by aligning it parallel to the axis 63 of the anterior guidepost 26 so that an X-ray beam from the cone 62 is at a right angle with respect to this reference plane. The guidepost 26 allows the technician to estimate relatively accurately the position of the reference plane 64, and guidepost 24 allows him to accurately locate the center of the packet 12.

FIG. 6 illustrates the placement of the device 10 in the mouth of the patient to take an X-ray of the upper lateral cuspid, and FIG. 7 illustrates placement of the device 10 in the mouth of the patient to take an X-ray of the lower lateral cuspid. Again, as with all of the upper and lower front teeth, the device 10 is placed so that the patient will lightly grip the lateral edges 28 and 32 of the device 10 with his or her teeth. When taking X-rays of the anterior teeth, the film packet 12 is placed in the device 10 so that the longitudinal axis of the packet 12 is positioned coincident with the anterior slot 16.

FIGS. 8-13 illustrate how the device 10 is used to take X-ray pictures of the posterior teeth. When taking pictures of the posterior teeth, the device 10 is tipped on its side so that the teeth bite into the faces 34 and 36 when the patient closes his or her jaws. The film packet 12 is placed in the device 10 in different locations, depending upon which teeth are being X-rayed. When taking X-ray pictures of the bicuspid teeth and the molars (as depicted in FIGS. 8-11), the packet 12 is inserted so that one of its edges is wedged between the walls 44 and 46 of the posterior slot 20. This film packet 12 is inserted behind the teeth and between the tongue, with the guideposts 24 and 26 pointing toward the patient's cheek, but exposed so that they are in view of the technician. The tongue lies partially suppressed by the lingual hump 30, along the lateral edge 32, which is curved to allow for the curvature of the tongue. The corner of the mouth engages the junction 70 where the guidepost 26 merges with the lateral edge 28, and the guidepost 26 pushes the corner of the mouth backwards as the X-ray technician pushes against the device 10. Thus, the guidepost 26 facilitates easy positioning of the device 10 in the patient's mouth. When in the correct position, the patient bites firmly onto the faces 34 and 36, and almost through the thickness of the device 10, bringing the upper and lower teeth close together to minimize the space between the upper and lower teeth. With many prior art devices, the teeth cannot be positioned close together, thus the posterior guidepost 26 is used by the X-ray technician to position the cone 62 of the X-ray camera so that the tip of the cone overlies the center of the film packet 12, aligning the path of the X-ray beam and axis z of the guidepost 26 so that they are parallel. When the X-ray has been taken, the patient opens his or her jaws, releasing the grip on the device 10, to allow the stretched mouth to relax and push against the junction 70 to force the device outward.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device adapted to be inserted into the mouth of a patient while holding a dental X-ray film packet, said device comprising:

a body member having first and second lateral side edges opposite each other, an anterior side edge, a posterior side edge, and substantially flat, parallel, spaced-apart surfaces, said body member being rigid so that it does not easily bend about a longitudinal axis extending between the anterior side edge and the posterior side edge;

said anterior and posterior side edges being spaced apart a distance which enables either the anterior side edge or the posterior side edge to be inserted into the mouth of the patient with a portion of the body member extending beyond the mouth;

a posterior slot adapted to hold a dental X-ray film packet, said posterior slot extending from the posterior side edge inward into the body member along a substantially straight line, forming an angle of about 16 degrees with the longitudinal axis, said posterior slot providing a narrow gap into which the film packet is inserted and held firmly in place;

an anterior slot adapted to hold a dental X-ray film packet extending from the anterior side edge inward into the body member along a substantially straight line, parallel to the longitudinal axis, said anterior slot providing a narrow gap into which the film packet is inserted and held firmly in place, said gap having a substantially uniform width; and an anterior guide member and a posterior guide member, said anterior guide member extending outward from the second lateral side edge at substantially a right angle to the anterior slot, and said posterior guide member extending outward from the second side edge at substantially a right angle to the posterior slot.

2. The device of claim 1 wherein the body member has a length between 3.75 and 4.50 inches, a width between 1.75 and 2.00 inches, and a thickness between 0.125 and 0.25-inch.

3. The device of claim 1 having, near an inward portion of the posterior slot, an outwardly-projecting body section which provides reinforcement, so that, upon inserting the film packet into the posterior slot, the body member does not fracture.

4. The device of claim 1 wherein the body member is made of a polymeric foam material.

5. The device of claim 4 wherein the body member is made of expanded polystyrene.

6. The holder of claim 1, having a predetermined curvature on a lateral side near the posterior side to accommodate positioning of the patient's tongue.

7. A dental X-ray film packet holder for holding a film packet in a patient's mouth, said holder comprising a substantially flat, substantially rigid body member having anterior and posterior ends, with a predetermined curvature near the posterior end to accommodate positioning the patient's tongue, and a first film packet-holding slot extending from the posterior end into the body member, and forming an angle of about 16 degrees with a longitudinal axis joining the anterior and posterior ends, and a second film packet-holding slot extending from the anterior end into the body member, substantially parallel to the longitudinal axis and a lateral side edge from which a positioning element extends.

8. The holder of claim 7 wherein the anterior and posterior ends are spaced apart a distance which enables either end to be inserted into the mouth of a patient with a portion of the body member extending beyond the mouth.

9. The holder of claim 7 wherein the positioning element comprises a pair of guide members which extend outward from the lateral side edge of the body member, one of the guide members being at substantially a right angle to said first film packet-holding slot, and the other guide member being at substantially a right angle to said second film packet-holding slot, the one guide member being displaced inward from the posterior end by a distance between 0.75 and 1.25 inches, and the other guide member being displaced inward from the anterior end by a distance between 1.125 and 1.50 inches.

10. The holder of claim 9 wherein each guide member has a length between 0.50 and 0.75-inch and a width between 0.3125 and 0.375-inch.

11. The holder of claim 10 wherein the body member has a length between 3.75 and 4.50 inches, a width between 1.75 and 2.00 inches, and a thickness between 0.125 and 0.25-inch.

12. The holder of claim 11 including an enlarged body section near an inward section of the posterior slot which provides reinforcement, so that, upon inserting the film packet into the posterior slot, the body member does not fracture, said body section extending outward from a second lateral side edge of the body member opposite the first lateral side edge.

13. The holder of claim 7 wherein said first film packet-holding slot has a length between 0.5 and 1.25 inches and extends from a posterior side edge of the body member inward into the body member along a substantially straight line.

14. The holder of claim 7 wherein the body member is made of a foam polymeric material.

15. The holder of claim 14 wherein the polymeric material is expanded polystyrene.

16. A dental X-ray film packet holder having a predetermined silhouette with an anterior and a posterior end formed by severing the holder from a sheet of polymeric material, said holder comprising a generally flat, substantially rigid body member having a first film packet-holding slot in the anterior end extending into the body member parallel to a longitudinal axis from the anterior end to the posterior end, a second film packet-holding slot in the posterior end extending into the body member forming an angle of about 16 degrees with the longitudinal axis, and a pair of guide members extending outward from a lateral side edge of the body member.

17. The holder of claim 16 wherein one of the guide members is near the second film packet-holding slot and at substantially a right angle to the second film packet-holding slot, and the other guide member is near the first film packet-holding slot and at substantially a right angle to the first film packet-holding slot.

18. The holder of claim 17 wherein the material surrounding the film packet-holding slots forms jaws on opposed sides of each slot which provide resilient clamping action upon inserting a film packet into either of the slots, each slot having a length between 0.50 and 1.25 inches and each slot extending into the body member along a substantially straight line to provide a narrow gap into which the film packet is inserted and held firmly in place by the clamping action provided by the jaws, each gap having a substantially uniform width between 0.004 and 0.015 inch.

19. A method of using a bisecting angle technique for taking an X-ray picture of a tooth of a patient, comprising the steps of:

provides a holder comprising a generally flat, substantially rigid body member having a film packet-holding slot which extends from an end of the body member into the body member, and a positioning element extending outward from a lateral side edge forming an angle of about 106 degrees with the slot;

placing a dental X-ray film packet in the slot;

inserting the holder into the mouth of the patient; and aligning a cone of an X-ray camera relative to the positioning element so that an X-ray beam emitted by the camera will be parallel to the element and at right angles to a reference plane which bisects an angle formed between a face of the film packet and a longitudinal axis of the tooth.

20. A method of taking an X-ray picture of a tooth of a patient, comprising the steps of:

providing a holder comprising a generally flat, substantially rigid body member having a film packet-holding slot which extends from an end of the body member into the body member, a first positioning element extending outward from a lateral side edge of the body member forming angle of about 90 degrees with the slot, and a second positioning element extending outward from a lateral side edge forming an angle of about 106 degrees with the slot;

placing a dental X-ray film packet in the slot;

inserting the holder into the mouth of the patient; and aligning the cone of an X-ray camera with a face of the film packet using the positioning elements to correctly position the cone with respect to the film packet.

21. The method of claim 20 wherein the X-ray camera is aligned at a right angle with the face of the film packet by adjusting the camera to be parallel to the first positioning element.

22. The method of claim 20 wherein the X-ray camera is aligned at right angles to a plane bisecting an angle formed between the face of the film and a longitudinal axis of the tooth by adjusting the camera to be parallel to the second positioning element.

23. A device adapted to be inserted into the mouth of a patient while holding a dental X-ray film packet, said device comprising:

a body member constructed of polymeric foam having first and second lateral side edges opposite each other, an anterior side edge, a posterior side edge, and substantially flat, parallel, spaced-apart surfaces, said body member being sufficiently rigid so that it does not easily bend about a longitudinal axis extending between the anterior side edge and the posterior side edge and yet sufficiently compressible to allow the patient to bite into it;

said anterior and posterior side edges being spaced apart a distance which enables either the anterior side edge or the posterior side edge to be inserted into the mouth of the patient with a portion of the body member extending beyond the mouth;

a posterior slot adapted to hold a dental X-ray film packet, said posterior slot extending from the posterior side edge inward into the body member along a substantially straight line forming an angle of about 16 degrees with the longitudinal axis, said posterior slot providing a narrow gap into which the film packet is inserted and held firmly in place;

an anterior slot adapted to hold a dental X-ray film packet extending from the anterior side edge inward into the body member along a substantially straight line parallel to the longitudinal axis, said anterior slot providing a narrow gap into which the film packet is inserted and held firmly in place, said gap having a substantially uniform width; and an anterior guide member and a posterior guide member, said anterior guide member extending outward from the second lateral side edge at substantially a right angle to the anterior slot, and said posterior guide member extending outward from the second lateral side edge at substantially a right angle to the posterior slot.

* * * * *